United States Patent [19]
Farnsworth

[11] Patent Number: 6,104,987
[45] Date of Patent: Aug. 15, 2000

[54] SYSTEM FOR MONITORING DRYER DRUM TEMPERATURES

[75] Inventor: David C. Farnsworth, St. Petersburg, Fla.

[73] Assignee: The Nash Engineering Company, Trumbull, Conn.

[21] Appl. No.: 08/943,746

[22] Filed: Oct. 3, 1997

[51] Int. Cl.[7] .............................. D06F 58/28; D21F 5/06
[52] U.S. Cl. ..................... 702/130; 340/870.08; 702/188
[58] Field of Search .................... 702/130, 136, 702/188; 219/502; 340/870.08; 370/311; 101/716

[56] References Cited

U.S. PATENT DOCUMENTS

| | | | |
|---|---|---|---|
| 3,552,642 | 1/1971 | Boyd | 236/15 |
| 3,697,726 | 10/1972 | Geronime | 219/469 |
| 3,715,923 | 2/1973 | Hornbaker et al. | . |
| 3,739,279 | 6/1973 | Hollis | 325/113 |
| 3,815,254 | 6/1974 | Mills | 34/31 |
| 3,864,842 | 2/1975 | Sawyer | 34/41 |
| 3,878,721 | 4/1975 | Nath | 73/351 |
| 3,971,362 | 7/1976 | Pope et al. | 128/2 |
| 4,089,121 | 5/1978 | Sawyer | 34/16 |
| 4,114,023 | 9/1978 | Zelinka et al. | 219/471 |
| 4,312,219 | 1/1982 | Lee et al. | 73/76 |
| 4,391,913 | 7/1983 | Keldmann | 236/36 |
| 4,518,962 | 5/1985 | Imose et al. | 340/870.28 |
| 4,689,621 | 8/1987 | Kleinberg | 340/817.17 |
| 4,844,076 | 7/1989 | Lesho et al. | 128/631 |
| 4,928,013 | 5/1990 | Howarth et al. | 250/339 |
| 5,381,341 | 1/1995 | Herrela et al. | 364/471 |
| 5,456,025 | 10/1995 | Joiner et al. | 34/528 |
| 5,580,478 | 12/1996 | Tanamachi et al. | 219/502 |
| 5,594,740 | 1/1997 | LaDue | 379/59 |

FOREIGN PATENT DOCUMENTS 24 28 890  1/1976  Germany.

OTHER PUBLICATIONS

"Motor Protection," Wireless Data Corporation publication, Mountain View, CA (undated).
"Motor Rotor Temperature Monitor Model 1700A Master System," Wireless Data Corporation publication, Mountain View, CA (undated).

*Primary Examiner*—Kamini Shah
*Attorney, Agent, or Firm*—Fish & Neave; G. Victor Treyz; Joel Weiss

[57] ABSTRACT

A system is provided for monitoring the temperature of dryer drums in papermaking or textile machinery. Wireless temperature sensors are mounted to each dryer drum. Sensor pickup devices receive temperature signals from the temperature sensors that are processed by a computer. Multiplexers may be used to provide the signals from multiple sensor pickup devices to a radio-frequency transmitter. A radio-frequency receiver may be used to receive signals from the transmitter and provide these signals to a computer. The computer determines the temperature of the drums by processing the temperature signals. The computer may provide control signals to a distributed control system to control the temperature of the drums (e.g., by controlling the flow of steam into the dryer section).

30 Claims, 4 Drawing Sheets

SYSTEM FOR MONITORING DRYER DRUM TEMPERATURES

BACKGROUND OF THE INVENTION

This invention relates to monitoring the temperature of drums used in the dryer sections of machines used to process sheets of paper, textiles, and the like.

Papermaking and textile machines handle continuous sheets of paper or fabric. One of the steps involved in making paper or the processing of textile products is the removal of moisture from the product. The textile or paper materials are typically dried by passing them over the surfaces of a series of cylindrical structures called drums. Because the production rate and the quality of the product are affected by the temperature of the drums, maintaining proper drum temperature is an important aspect of the production process.

One technique for monitoring dryer drum temperatures involves using a handheld infrared temperature sensor gun. Temperature readings can be taken by pointing the sensor gun at an exposed surface of a drum. However, such temperature readings must be taken manually and are strongly influenced by the emissivity of the drum. Because drum emissivity can vary depending on the surface condition of the drum (i.e., whether the drum is painted, rusted from exposure to water, shiny, etc.), temperature readings taken using handheld infrared temperature sensors can be inaccurate.

Another technique for monitoring drum temperatures involves using a handheld rubbing-contact temperature sensor. Rubbing-contact temperature sensors typically have wheeled carriages that are placed in rubbing contact with an exposed surface of the rotating drum. Because rubbing-contact sensors are placed near to the moving surfaces of the papermaking machinery, using such sensors is not without risk to the operator taking the temperature measurement. In addition, typical rubbing-contact sensors are speed rated, so that a given sensor can only be used to make temperature measurements if the drum is rotating below a particular speed.

Still another technique for monitoring drum temperatures involves calculating the drum temperature based on known parameters, such as the pressure of the saturated steam used to heat the interior of the drum, the thickness of the water condensate layer built up on the inner drum surface, the rate of evaporation on the exterior of the drum, the structure of the drum (i.e., whether the drum has any raised surfaces), etc. The results of this type of heat flow analysis tend to be inaccurate, because it is not possible to measure or determine all of the parameters that influence the drum temperature or to precisely gauge the interplay between the various measured parameters and the drum temperature.

It is therefore an object of the present invention to provide improved techniques for monitoring the temperature of the drying drums in machines used to process sheets of paper, textiles, and the like.

SUMMARY OF THE INVENTION

This and other objects of the invention are accomplished in accordance with the principles of the present invention by providing a system and methods for monitoring the operation of a dryer section of a papermaking, textile, or similar machine. In one embodiment, temperature sensors are used to measure the temperature of dryer drums in the dryer section. The sensors may be mounted on the end faces of the dryer drums in holes that allow the active sensor elements to be placed in contact with the cylindrical member that forms the outer drum surface may be mounted on the dryer drum surface, or inside the dryer drum. The sensors transmit temperature signals without the use of wires to sensor pickup devices. In another embodiment the system may be expanded to include a means for measuring the rotational speed of the drum and the relative humidity of the air adjacent to the drums.

Signals from multiple sensor pickup devices, and from the relative humidity sensors if present, may be multiplexed using a multiplexer. Multiplexed signals from the multiplexer may be provided to a radio-frequency transmitter that transmits these signals to a corresponding radio-frequency receiver. Signals from the receiver are preferably provided to processing circuitry such as a personal computer. If desired, such processing circuitry may be provided inside the multiplexer housing. Humidity measurements may be multiplexed with the temperature signals. If desired, the multiplexed signals may be provided to the processing circuitry using a hard-wired communications link. The computer may process the temperature signals and humidity signals and display corresponding temperature and humidity information for the dryer so that the operator may adjust the temperature of the drums and the humidity in the dryer manually. Alternatively, the computer may process the measured signals and generate corresponding control signals for controlling the system. The control signals may be provided by the computer to a distributed control system that controls the operation of steam valves and air supply valves in the drying system. Alternatively, the computer may provide such control signals directly to the valves. Controlling the steam valves allows control of the flow of pressurized steam into and out of the interior of the dryer drums and therefore allows control of the temperature of the dryer drums. Controlling the air supply valves allows control of the flow of low humidity air into and out of the dryer hood.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
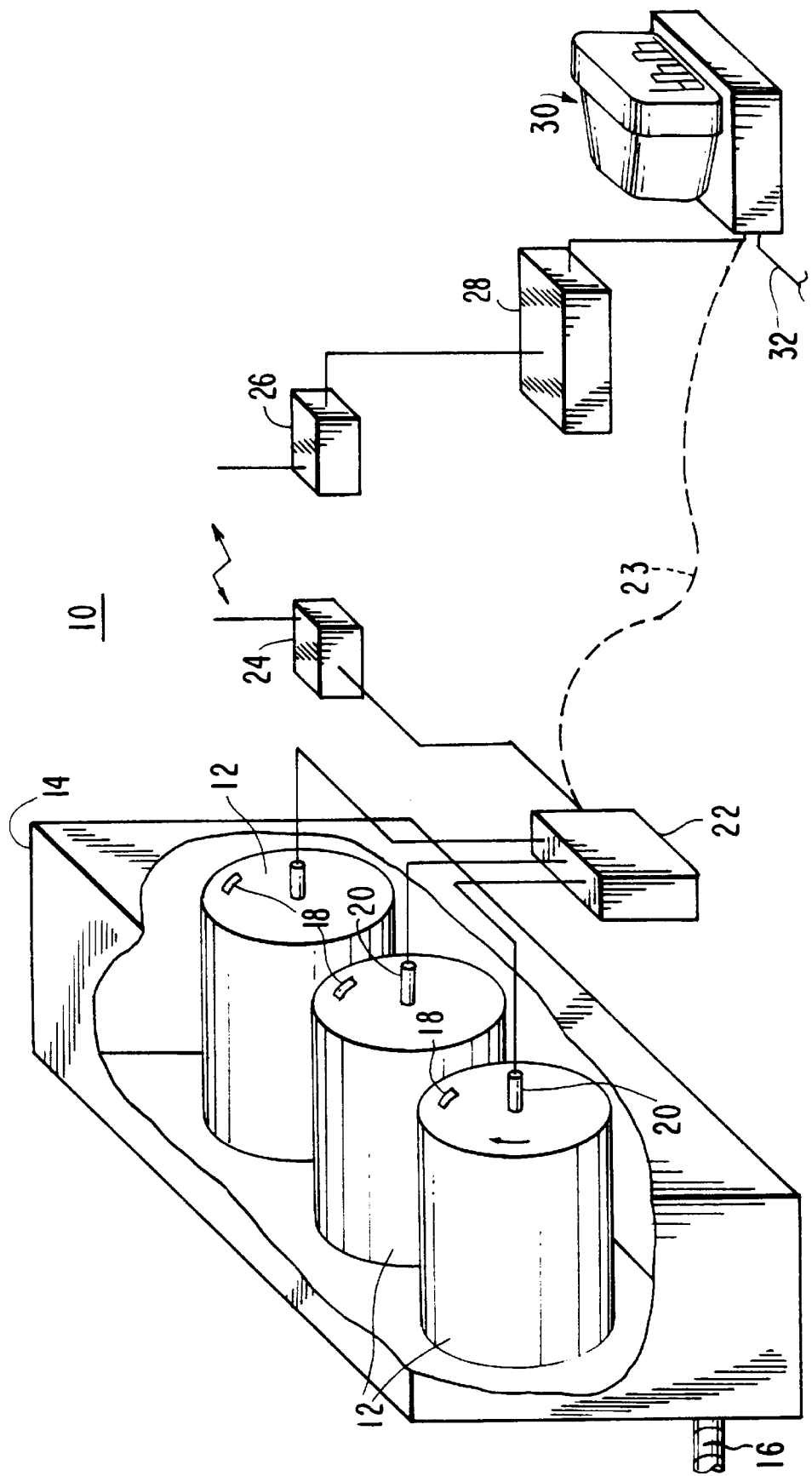
FIG. 1 is a partially cut-away perspective view of a dryer section of an illustrative machine in accordance with the present invention.

An illustrative system 10 in accordance with the present invention is shown in FIG. 1. System 10 has dryer drums 12, which are used to dry a continuous sheet of paper, fabric, or the like (not shown) fed from an upstream point in the machine. The sheet to be dried is passed over the outer surface of dryer drums 12, which rotate continuously during the operation of the machine. The dryer section of system 10 is depicted as having only three dryer drums 12 in dryer hood 14 to avoid over-complicating the drawings. However, a typical dryer section of a papermaking or textile machine may have five or more dryer drums arranged in series.

The temperature of dryer drums 12 must be maintained at a proper level to maximize production rate and to ensure the production of a high-quality product. The temperature of dryer drums 12 can be controlled by varying the flow of pressurized saturated steam to the interior of dryer drums 12. Steam is supplied through inlet pipe 16 to manifolds (not shown), each of which supplies steam to several dryer drums 12. In some areas of the machine, steam valves are provided that allow the temperature of each dryer drum 12 to be controlled independently. As a result, it is generally desirable to measure the temperature of each individual dryer drum 12.

Accordingly, each dryer drum 12 is provided with a separate temperature sensor 18. Temperature sensors 18 are preferably wireless and may be mounted on the end faces or drum surfaces of dryer drums 14. Suitable temperature sensors 18 include those based on temperature sensitive crystals, such as shown in U.S. Pat. No. 4,844,076 and those based on thermocouples. Regardless of the type of temperature sensors used, temperature signals representative of the temperatures measured by temperature sensors 18 are transmitted wirelessly from temperature sensors 18 to respective sensor pickup devices 20.

Any suitable technique may be used to avoid signal interference between adjacent sensors 18. For example, because the signal strength of the transmitted signals from each sensor 18 decrease with increasing distance from the sensor, the spatial separation between sensors 18 may be relied upon to prevent interference. If desired, sensors 18 can be assigned individual frequencies on which to transmit information.

Sensor pickup devices 20 respond to the signals from the temperature sensor. If desired, the temperature signals may be passed to a multiplexer such as multiplexer 22, to reduce the number of signal output lines in the system. Multiplexer 22 is typically also connected to additional multiplexers (not shown in FIG. 1). Multiplexer 22 may multiplex multiple input signals onto a single output using any suitable multiplexing technique.

The multiplexed output of multiplexer 22 may be provided to computer 30 using hard-wired communications link 23. Alternatively, the multiplexed output of multiplexer 22 may be provided to a wireless transmitter 24 (e.g., a radio-frequency transmitter), which transmits the temperature signals to receiver 26. The range of transmitter 24 is sufficient to allow receiver 26 to be located away from the immediate area surrounding dryer hood 14. Signals from receiver 26 may be conditioned by interface unit 28. If desired, the signal conditioning functions of interface unit 28 may be provided by receiver 26.

Signals from interface unit 28 (or from a receiver 26 with suitable signal conditioning functions) are received by computer 30. Computer 30 preferably has the ability to process raw sensor data and convert this data into a usable format. For example, computer 30 may process the temperature signals from sensors 18 to produce a visible display, such as a plotted line or a bar chart in which the height of each bar is proportional to the measured temperature for an associated sensor 18. A system operator can adjust the temperature of dryer drums 12 based on the displayed temperature information for each sensor 18. Computer 30 can provide control signals based on processed temperature information to a distributed control system or directly to plant equipment (e.g., steam valves) using a hard-wired communications link via output 32. The processing functions of computer 30 may be provided in the housing of multiplexer 22 if desired.

Figure 2A:
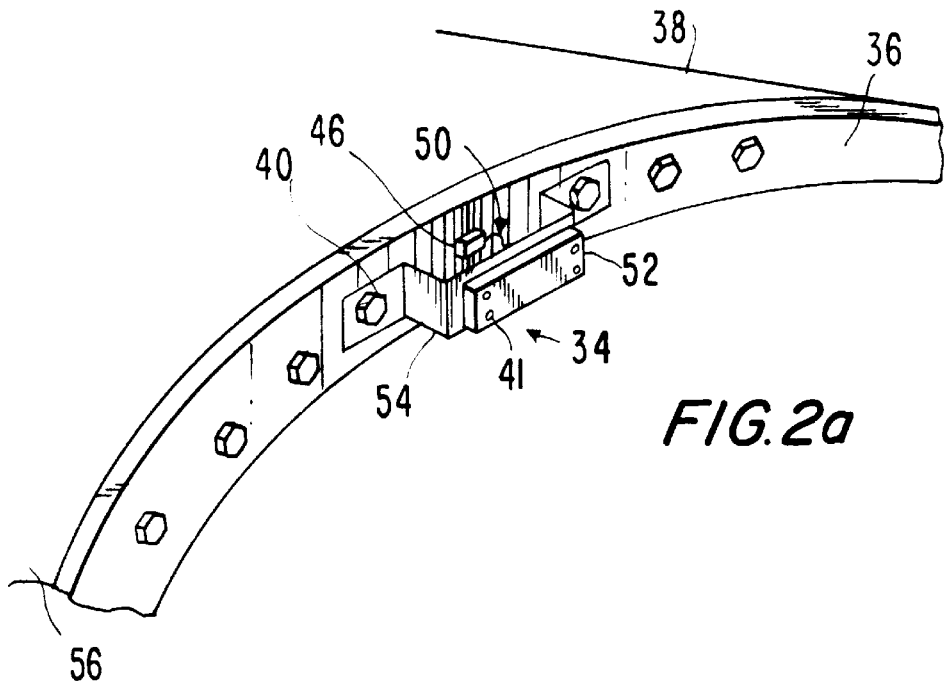
FIG. 2a is a perspective view of a dryer drum in accordance with the present invention.
Figure 2B:
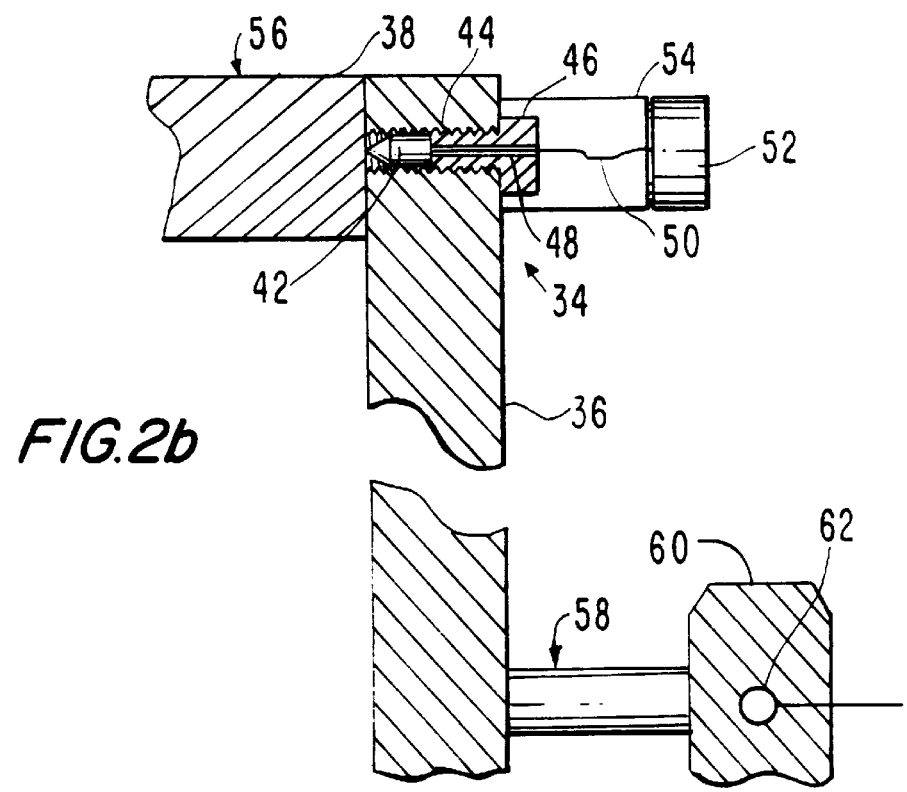
FIG. 2b is a cross-sectional view of a dryer drum in accordance with the present invention showing placement of the temperature sensor and temperature sensor pickup device on the dryer end face.
Figure 2C:
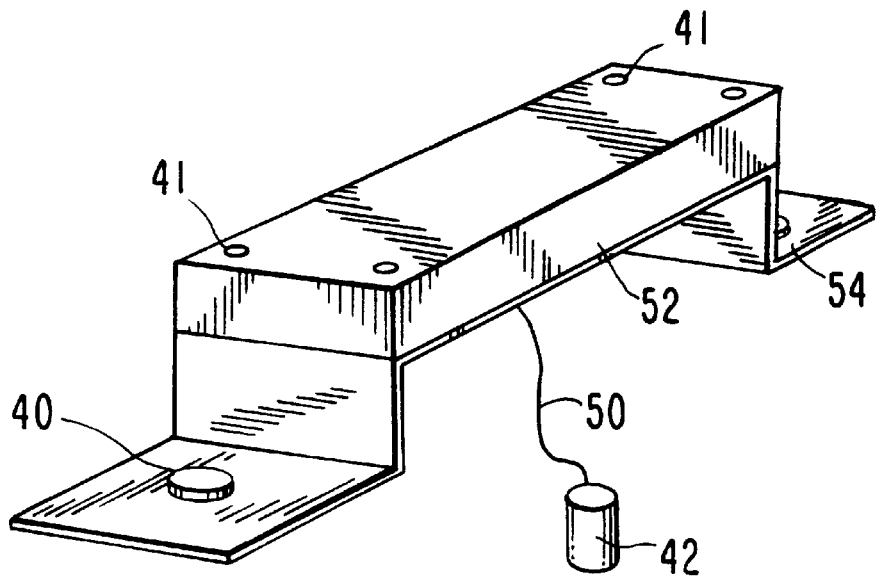
FIG. 2c is a perspective view of a temperature measurement assembly in accordance with the present invention.

As shown in FIGS. 2a and 2b, temperature sensor assembly 34 may be mounted to dryer drum end face 36 near the radially outermost portion of end face 36, where end face 36 is connected to dryer cylindrical member 38 with bolts such as bolt 40. Temperature sensor 34 has a thermal sensor element 42, which may be mounted in threaded jack screw hole 44 using screw 46 or device of a similar function. This arrangement allows the tip of temperature sensor element 42 to be maintained in contact with cylindrical member 38 to measure the temperature of cylindrical member 38 adjacent to the cylindrical surface. Screw 46 has feed-through passage 48, which allows wire 50 to connect temperature sensor element 42 to sensor assembly transmitter unit 52. Transmitter unit 52 may be mounted to end face 36 with bracket 54 and bolt 40. Screws 41 hold transmitter unit 52 to bracket 54. Dryer drum 56 is supported by integral shaft 58 and is mounted in shaft support structure 60. Sensor pickup device 62 may be mounted to shaft support structure 60 or other suitable location. FIG. 2c is a perspective view of the sensor assembly components of FIGS. 2a and 2b.

Figure 2D:
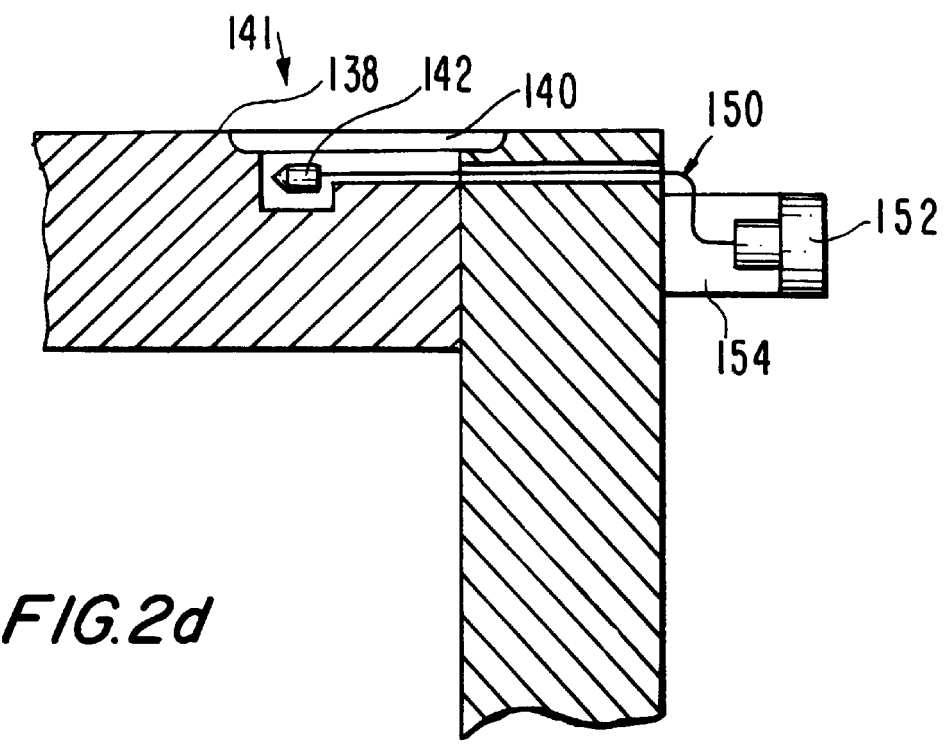
FIG. 2d is a cross-sectional view of a dryer drum in accordance with the present invention in which the temperature sensitive element is mounted just beneath the dryer drum surface.

FIG. 2d shows an alternative embodiment of the invention in which temperature sensor element 142 is mounted to dryer drum surface 141 (e.g., just beneath the surface of cylindrical member 138 under plate 140, which may be attached to cylindrical member 138 with screws or epoxy). Sensor element 142 is connected to transmitter 152 with wire 150. Transmitter 152 is mounted to the dryer end face with bracket 154.

Figure 3:
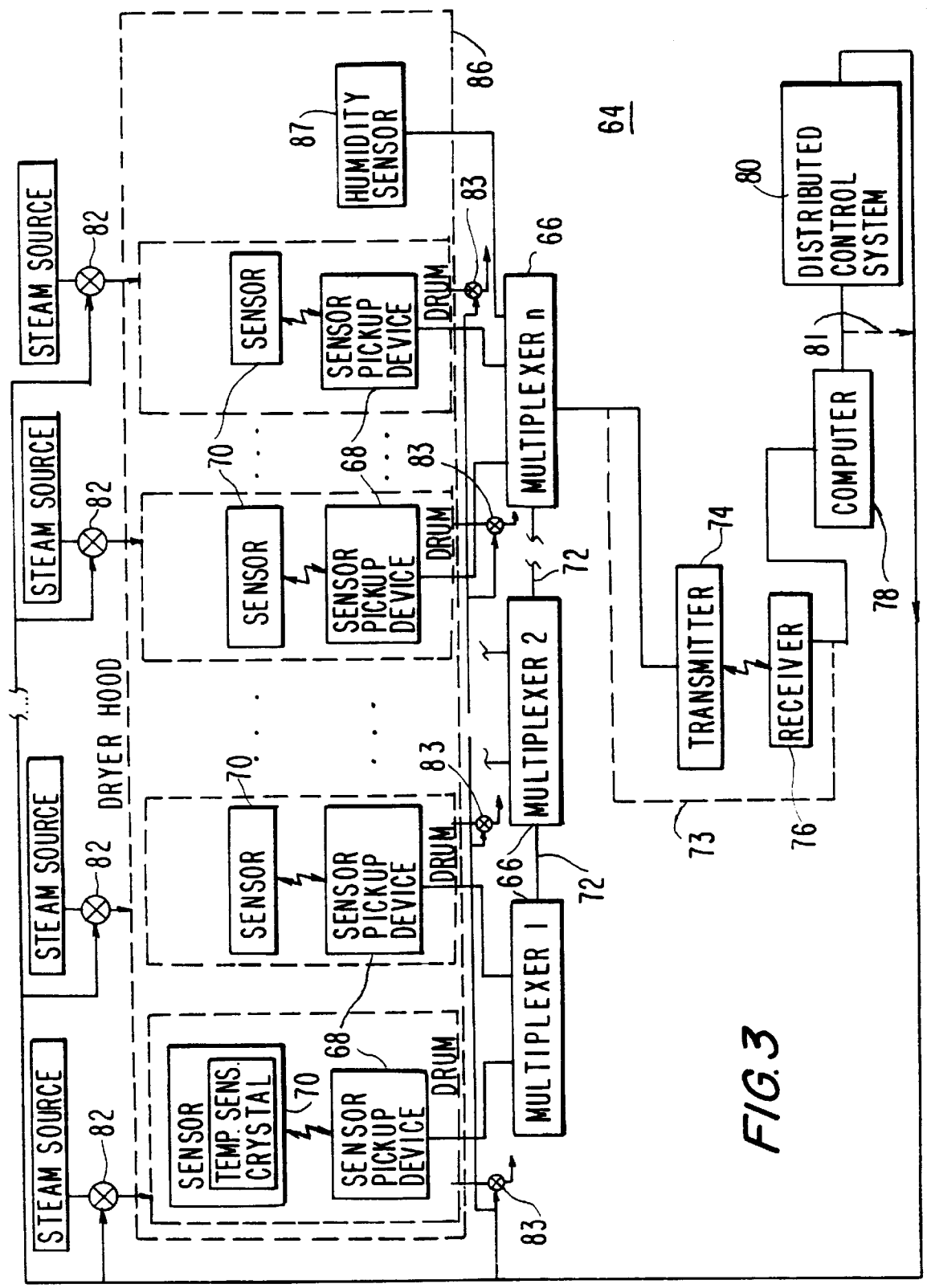
FIG. 3 is a schematic diagram of an illustrative system for monitoring humidity and dryer drum temperatures in accordance with the present invention.

As shown in FIG. 3, system 64 of the present invention may have multiple multiplexers 66, each of which receives temperature signals from an associated group of sensor pickup devices 68 and wireless sensors 70. If desired, multiplexers 66 may be interconnected using communications lines 72, so that, for example, the multiplexed output from multiplexer 1 is passed to multiplexer 2, etc. Multiplexer n provides an output signal containing the temperature signals from each of sensors 70. One or more humidity sensors 87 may be provided in dryer hood 86 to monitor the humidity of the hood during operation of the system. Humidity signals may be multiplexed with the temperature signals using multiplexer n.

If desired, the temperature signals and humidity signals may be provided directly to computer 78 via hard-wired communications link 73. Alternatively, these signals may be provided to transmitter 74, which transmits the signals to receiver 76. Receiver 76 receives temperature and humidity signals, and passes the signals to computer 78. Because transmission between transmitter 74 and receiver 76 is wireless, it is not necessary to locate receiver 76 and computer 78 adjacent to sensors 70, sensor pickup devices 68, multiplexers 66, and transmitter 74.

Computer 78 processes the temperature and humidity signals received from receiver 76 or received via hard-wired communications link 73. Computer 78 preferably displays information concerning the humidity within the hood 86 and temperature of dryer drums 12, so that an operator may make appropriate manual adjustments to the valves, control mechanisms used to control the temperatures of dryer drums 12, and control mechanisms to control the humidity within the hood 86. If desired, computer 78 may generate control signals for automatically controlling the temperature of dryer drums 12 and the humidity within the hood 86 via distributed control system 80. The functions of computer 78 may be provided by processing circuitry located in the housing of one or more multiplexers 66.

Control signals from computer 78 for controlling papermaking, textile, or similar machinery may be distributed throughout the papermaking or textile plant using distributed control system 80 or communications link 81. Control signals from computer 78 may be used to control machinery such as steam source valves 82 and condensate steam valves 83. Controlling steam valves 82 and 83 determines the amount of pressurized steam that flows from steam source 84 through dryer drums 12 in dryer hood 86 and therefore allows computer 78 to control the temperature of dryer drums 12 based on the temperature readings taken automatically by sensors 70.

If desired, the temperature monitoring system may be used with dryers other than rotating drum dryers. For example, the temperature monitoring system may be used with belt dryers or dryers with flat drying surfaces. In addition, the temperature sensor assemblies may be mounted to the inside of the dryer drums if desired.

The foregoing is merely illustrative of the principles of this invention and various modifications can be made by those skilled in the art without departing from the scope and spirit of the invention.

What is claimed is:

1. A system for measuring the temperatures of heated dryer drums, comprising:

temperature sensors mounted to the dryer drums for generating temperature signals proportional to the temperatures of the dryer drums and for wirelessly transmitting the temperature signals using radio frequency transmissions;

sensor pickup devices for receiving the wirelessly transmitted temperature signals generated by the temperature sensors;

communications circuitry for receiving the temperature signals from the sensor pickup devices and for communicating the temperature signals; and processing circuitry for receiving the temperature signals from the communications circuitry and for processing the temperature signal.

2. The system defined in claim 1 wherein the communications circuitry comprises:

a transmitter for wirelessly transmitting temperature signals from the sensor pickup devices; and a receiver for receiving the wirelessly transmitted temperature signals from the transmitter.

3. The system defined in claim 1 wherein the communications circuitry comprises a multiplexer that receives temperature signals from a plurality of the sensor pickup devices and that provides a corresponding temperature signal output.

4. The system defined in claim 1 wherein the communications circuitry comprises a plurality of multiplexers that each receive temperature signals from a plurality of the sensor pickup devices and that provide corresponding temperature signal outputs.

5. The system defined in claim 1 wherein each dryer drum has a dryer drum surface, the temperature sensors comprising temperature sensor elements that are mounted to the dryer drum surface.

6. The system defined in claim 1 wherein each dryer drum has an end face, the temperature sensors comprising temperature sensor elements that are mounted to the dryer drum end faces.

7. The system defined in claim 1 wherein each dryer drum has a cylindrical member covered by an end face having a hole that passes from the exterior surface of the end face to the cylindrical member, the temperature sensors comprising temperature sensor elements that are mounted in the holes in contact with the cylindrical members.

8. The system defined in claim 1 wherein each dryer drum has a cylindrical member covered by an end face, the temperature sensors comprising temperature sensor elements that are mounted just beneath the surface of the cylindrical member.

9. The system defined in claim 1 wherein the sensors contain temperature sensitive crystals.

10. The system defined in claim 1 wherein the processing circuitry is a computer for processing the temperature signals and generating a corresponding display of temperature information for the dryer drums.

11. The system defined in claim 1 further comprising:

a steam valve for controlling the flow of steam into a given dryer drum to adjust the temperature of the given dryer drum; and a distributed control system that receives control signals from the processing circuitry to control the operation of the steam valve.

12. The system defined in claim 1 further comprising:

a steam valve for controlling the flow of steam into a given dryer drum to adjust the temperature of the given dryer drum; and a hard-wired communications link that receives control signals from the processing circuitry to control the operation of the steam valve.

13. The system defined in claim 1 wherein the dryer drums further comprise steam-heated papermaking dryer drums.

14. The system defined in claim 1 further comprising a humidity sensor for monitoring humidity in the vicinity of the dryer drums.

15. A method for measuring the temperatures of heated dryer drums, comprising the steps of:

generating temperature signals proportional to the temperatures of the dryer drums with temperature sensors mounted to dryer drums;

wirelessly transmitting the temperature signals with the temperature sensors using radio frequency transmissions;

receiving the wirelessly transmitted temperature signals generated by the temperature sensors with sensor pickup devices;

communicating the temperature signals received by the sensor pickup devices to processing circuitry with communications circuitry; and processing the temperature signals with the processing circuitry.

16. The method defined in claim 15 wherein the step of communicating comprises the step of:

wirelessly transmitting temperature signals from the sensor pickup devices with a transmitter; and receiving the wirelessly transmitted temperature signals from the transmitter with a receiver.

17. The method defined in claim 15 wherein step of communicating further comprises the steps of:

receiving temperature signals from a plurality of the sensor pickup devices with a multiplexer; and providing a corresponding temperature signal output with the multiplexer.

18. The method defined in claim 15 wherein step of communicating further comprises the steps of:

receiving temperature signals from a plurality of the sensor pickup devices with a plurality of multiplexers; and providing a corresponding temperature signal output with each of the multiplexers.

19. The method defined in claim 15 wherein each dryer drum has a dryer drum surface to which a temperature sensor element of one of the temperature sensors is mounted, the method further comprising the step of measuring the temperature of the dryer surface with the temperature sensors elements.

20. The method defined in claim 15 wherein each dryer drum has an end face to which a temperature sensor element of one of the temperature sensors is mounted, the method further comprising the step of measuring the temperature of the dryer drums with the temperature sensors elements.

21. The method defined in claim 15 wherein each dryer drum has a cylindrical member covered by an end face, the temperature sensors comprising temperature sensor elements that are mounted just beneath the surface of the cylindrical member, the method further comprising the step of measuring the temperature of the dryer drums with the temperature sensor elements just beneath the surface of the cylindrical member.

22. The method defined in claim 15 wherein each dryer drum has a cylindrical member and an end face having holes that pass from the exterior surface of the end face to the cylindrical member, and the temperature sensors have temperature sensor elements that are mounted in the holes in contact with the cylinders, the method further comprising the step of measuring the temperature of the dryer drum with the temperature sensor elements in contact with the cylinders.

23. The method defined in claim 15 further comprising the step of providing the sensors with temperature sensitive crystals.

24. The method defined in claim 15 further comprising the step of processing the temperature signals and displaying corresponding temperature information for the dryer drums with a computer.

25. The method defined in claim 15 further comprising the steps of:

controlling the flow of steam into a given dryer drum with a steam valve to adjust the temperature of the given dryer drum; and controlling the operation of the steam valve with a distributed control system that receives control signals from the processing circuitry.

26. The method defined in claim 15 further comprising the steps of:

controlling the flow of steam into a given dryer drum with a steam valve to adjust the temperature of the given dryer drum; and controlling the operation of the steam valve with a hard-wired communications link that receives control signals from the processing circuitry.

27. The method defined in claim 15 wherein the dryer drums are papermaking dryer drums, the method further comprising the step of steam-heating the papermaking dryer drums.

28. The method defined in claim 15 further comprising the step of monitoring humidity in the vicinity of the dryer drums with a humidity sensor.

29. A system for measuring the temperatures of heated dryer members, comprising:

temperature sensors mounted to the dryer members for generating temperature signals proportional to the temperatures of the dryer members and for wirelessly transmitting the temperature signals using radio frequency transmissions;

sensor pickup devices for receiving the wirelessly transmitted temperature signals generated by the temperature sensors;

communications circuitry for receiving the temperature signals from the sensor pickup devices and for communicating the temperature signals; and processing circuitry for receiving the temperature signals from the communications circuitry and for processing the temperature signals.

30. A method for measuring the temperatures of heated dryer members, comprising the steps of:

generating temperature signals proportional to the temperatures of the dryer members with temperature sensors mounted to the dryer members;

wirelessly transmitting the temperature signals with the temperature sensors using radio frequency transmissions;

receiving the wirelessly transmitted temperature signals generated by the temperature sensors with sensor pickup devices;

communicating the temperature signals received by the sensor pickup devices to processing circuitry with communications circuitry; and processing the temperature signals with the processing circuitry.

* * * * *